M. A. Crooker.
Paddle Wheel.
No. 697. Reissued Apr. 26, 1859.
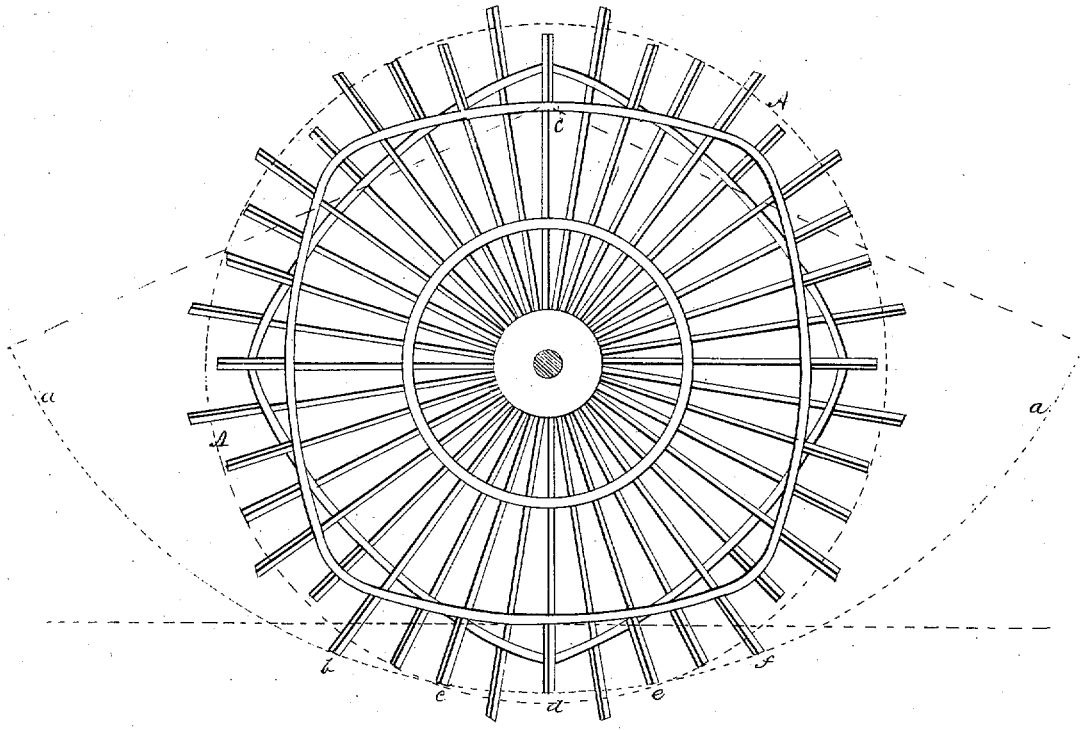
Witnesses
S. H. Maynard
George H. Mott
Inventor.
M. A. Crooker
N. PETERS, PHOTO-LITHOGRAPHER, WASHINGTON, D. C.

UNITED STATES PATENT OFFICE.

MATTHEW A. CROOKER, OF NEW YORK, N. Y.

ARRANGEMENT OF BUCKETS OF PADDLE WHEELS.

Specification forming part of Letters Patent No. 15,967, dated October 28, 1856; Reissue No. 697, dated April 26, 1859.

*To all whom it may concern:*

Be it known that I, MATTHEW AUGUSTUS CROOKER, of the city, county, and State of New York, have invented certain new and useful Improvements in Paddle-Wheels for Steamers; and I do hereby declare that the following is a full and clear description thereof, reference being made to the annexed drawing, making a part of the same, which is a side view or elevation of one form in which I construct a wheel.

The object of my invention is the obtaining of the highest coefficient in a paddle-wheel for the propulsion of steamers, said invention consisting of an improved plan for arranging the buckets or floats upon the circumference of the wheel, whereby the shocks are decreased and the useful effects of the buckets while immersed are increased.

The principle of my said invention lies in securing the buckets to the arms upon curved lines which are segments of a circle greater than a circle struck from the center or axis of the wheel.

Various attempts have been made to overcome the defects of the ordinary radial paddle-wheel, in which the buckets are affixed upon a circle the center of which is the shaft. In consequence of those defects it is known that the full effect of the power applied by the engine is not realized, the difference being a large percentage of the whole. This grows partly out of the action of the engine itself in giving off its power and partly from the mode in which the buckets of the wheel act upon the water. In the first place, as the resistance to the revolution in the water of a wheel truly circular is a constant one, while the power applied is always an inconstant or variable one, of course the speed at which a wheel so propelled moves will be irregular and variable. This arises from the fact that the power of the steam is applied to propel in the first instance a reciprocating body—viz., the piston—which has to be converted into a rotative one, as is well known. The wheel therefore is made to turn fastest when the piston is at half-stroke and slowest at the "dead-points." In fact, as then no power whatever is given off, it turns by its momentum only. Thus the boat so propelled is urged onward with a series of thrusts, as it were, while there is also a wasteful slip as the engine approaches its half-stroke.

The second defect named is now made apparent—viz., the shock caused by the violent urging of the buckets into the water as the engine approaches its half-stroke. These defects are not remedied, but only mitigated, by the combination of two engines, since each engine has its own dead-points.

By my improvement of arranging the buckets in arcs larger than true circles struck from the axis or shaft said buckets are caused to pass through the water at different depths or degrees of immersion, beginning at that one having the least dip and gradually increasing to that one having the greatest dip and then receding back in like order. In the case of single engines that arc of the wheel whereon the buckets have the least depth will be in the water when the engine is on the dead-points, and vice versa, when at half-stroke, the arc whereon the buckets are most deeply immersed. In the case of double engines the order of arrangement is different, for, as the power then approaches more nearly a constant force, the wheel in that case is divided into sections, so that while a series of buckets are entering the water, successively deepening their immersion, another set will be entering, successively diminishing the degree of immersion. This, while it diminishes the force of the shocks to a minimum, at the same time equalizes the power of the wheel. It will thus be seen that an element of value is obtained in addition to economizing the power—viz., that of safety—because as we are able to reduce the concussions of the wheel, so in like proportion is the liability to breakage reduced.

In the drawing I have shown my invention as constructed to be impelled with a double engine, and it exhibits two sets of buckets, forming a sectional wheel, said sections being so placed that the deepest one of a series of buckets upon one of the arcs shall be placed opposite to one which shall have the least depth upon the arc of the other section. The dotted circle A is struck from the center of the wheel-shaft, and is given to show the position of the buckets in relation thereto. The buckets are arranged upon segments of circles, being arcs struck from radii beyond the center about which the said buckets revolve. Such an arc is shown at *a*, its center being at *c*. Those buckets set at this portion of the wheel are represented by the letters *b c d e f*, the outer edges touching their boundary-curve *a*. The relation in which these stand to the circle A, it will now be seen, is such as already been described. Bucket *b* will project beyond said circle, that of *c* will be upon it, *d* will be within, *e* upon it, and *f* again beyond. The same rule will be applied to the other arcs which go to make up the circumference of the wheel as well as those upon the other section. An equivalent of this would be changing the areas of the different buckets—that is to say, cutting down the widths so that one edge only would conform to the line of the arc so inscribed on a radius greater than the true center, while the other edge would remain as if arranged upon a true circle. Thus the widths would be graduated to the power exerted by the engine, the least area being immersed while at the dead-points thereof and the greatest at the half-stroke.

I claim—

Arranging the floats or buckets of a paddle-wheel upon its arms, or the equivalent thereof, whereby the buckets shall be continuously increasing and diminishing their depth in the water as the said wheel revolves, as and for the purposes herein set forth.

M. A. CROOKER.

Witnesses:
J. P. PIRSSON,
S. H. MAYNARD.